United States Patent
Kuhn et al.

(10) Patent No.: US 10,046,358 B2
(45) Date of Patent: Aug. 14, 2018

(54) METHOD OF COATING A PLASTIC COMPONENT WITH PAINT AND METHOD OF COATING A COVER PANEL OF A MOTOR VEHICLE LIGHTING DEVICE

(71) Applicant: Automotive Lighting Reutlingen GmbH, Reutlingen (DE)

(72) Inventors: Sandra Kuhn, Reutlingen (DE);
Steffen Nothdurft, Reutlingen (DE);
Stefano Cordero, Reutlingen (DE);
Manfred Tauss, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 217 days.

(21) Appl. No.: 15/001,405

(22) Filed: Jan. 20, 2016

(65) Prior Publication Data

US 2016/0207064 A1  Jul. 21, 2016

(30) Foreign Application Priority Data

Jan. 21, 2015  (DE) .......................... 10 2015 200 948

(51) Int. Cl.
*B05D 1/30* (2006.01)
*B05D 7/02* (2006.01)
(Continued)

(52) U.S. Cl.
CPC ............. *B05D 1/305* (2013.01); *B05C 5/005* (2013.01); *B05D 1/02* (2013.01); *B05D 1/30* (2013.01);
(Continued)

(58) Field of Classification Search
None
See application file for complete search history.

(56) References Cited

U.S. PATENT DOCUMENTS

| | | | |
|---|---|---|---|
| 2013/0202799 A1* | 8/2013 | Schmidt ................... | B05D 1/30 427/316 |
| 2014/0017399 A1 | 1/2014 | Arndt et al. | |
| 2014/0302235 A1 | 10/2014 | Fleischmann et al. | |

FOREIGN PATENT DOCUMENTS

| DE | 102004027842 A1 | 1/2006 |
|---|---|---|
| DE | 102006040200 A1 | 3/2008 |

(Continued)

OTHER PUBLICATIONS

Examination Report issued by the German Patent Office for German Patent Application No. 10 2015 200 948.3 dated Aug. 27, 2015.
Communication dated Jun. 15, 2016 enclosing the European Search Report dated Jun. 8, 2016 issued by the European Patent Office for European Patent Application No. 15200743.1.

*Primary Examiner* — Nathan T Leong
(74) *Attorney, Agent, or Firm* — Howard & Howard Attorneys PLLC

(57) ABSTRACT

A method for coating a plastic component with a paint, wherein in a flooding step a surface of the plastic component to be coated is provided with paint by applying it to a flooding area and with a paint layer by the paint flowing off through a draining area. In order to make possible the coating of complex three-dimensional components, and before the execution of the flooding step, the draining area is provided with paint in a spraying step or alternatively in a separate preceding flooding step so that a paint coating is formed in the draining area, which consists of sprayed or separately flooded paint and flooded paint, and a paint coating is formed in the flooding area of the surface to be coated, which consists only of the flooded.

14 Claims, 3 Drawing Sheets

(51) Int. Cl.
    *B05D 7/00*     (2006.01)
    *B05D 1/02*     (2006.01)
    *B05C 5/00*     (2006.01)
    *B05D 1/36*     (2006.01)
    *B05D 3/02*     (2006.01)
    *C08J 7/04*     (2006.01)
    *C09D 183/04*     (2006.01)

(52) U.S. Cl.
    CPC ............ *B05D 1/36* (2013.01); *B05D 3/0218* (2013.01); *B05D 7/02* (2013.01); *B05D 7/53* (2013.01); *C08J 7/047* (2013.01); *C09D 183/04* (2013.01); *C08J 2369/00* (2013.01); *C08J 2483/04* (2013.01)

(56) References Cited

FOREIGN PATENT DOCUMENTS

| | | |
|---|---|---|
| DE | 102006040200 B4 | 9/2008 |
| EP | 1475359 A1 | 11/2004 |
| EP | 2394746 A1 | 12/2011 |
| EP | 2907706 A1 | 8/2015 |
| WO | WO2008025311 * | 8/2006 |
| WO | 2008134768 A1 | 11/2008 |
| WO | 2013087290 A1 | 6/2013 |

* cited by examiner

METHOD OF COATING A PLASTIC COMPONENT WITH PAINT AND METHOD OF COATING A COVER PANEL OF A MOTOR VEHICLE LIGHTING DEVICE

CROSS-REFERENCE TO RELATED APPLICATIONS

The present application claims priority to and all the benefits of German Patent Application No. 10 2015 200 948.3, filed on Jan. 21, 2015, which is hereby expressly incorporated herein by reference in its entirety.

BACKGROUND OF THE INVENTION

1. Field of the Invention

The present invention relates to a method of coating a plastic component with a paint. In a flooding step, a paint layer is applied to a surface of the plastic component to be coated by admitting paint to a flooding area and draining the paint through a draining area.

The invention also relates to a painting facility for coating a plastic component with a paint, wherein the painting facility comprises means for the execution of a flooding step, in which a paint layer is applied to the surface of the plastic component to be coated by admitting paint to a flooding area of the surface to be coated with the paint and draining the paint through a draining area.

Finally, the invention also relates to a cover panel made of a plastic material for closing the light exit opening of a lighting device of a vehicle.

2. Description of the Related Art

The coating of a plastic component can serve to protect the component from weathering and other environmental influences (e.g. UV radiation). In polycarbonate components, a suitable coating can achieve improved weathering and chemical resistance and a reduced susceptibility to scratching.

Flooding processes for forming coatings on flat, substantially planar plastic components are known from the prior art, as shown, for example, in DE 10 2004 027 842 A1 and as a rule are executed in such a manner that the plastic component for coating is essentially vertically oriented and a paint or similar material is applied to the so-called flooding area of the surface to be coated. The flooding area is located at the upper end of the vertically oriented plastic component. The application of paint to the flooding area may be carried out, for example, in that the plastic component is moved relative to a flood curtain so that the paint reaches the flooding area. Subsequently, the paint applied to the flooding area is distributed by gravity and depending on its viscosity over the remaining surface to be coated.

The draining area is the part of the surface to be coated, through which the paint applied to the flooding area flows away. In a vertically oriented plastic component, the paint applied to the flooding area flows downwards. The draining area therefore lies below the flooding area.

The coating formed on a vertically oriented plastic component by the flooding process has a wedge-shaped layer thickness distribution, when in the flooding area forms a layer of smaller thickness than in the draining area. If the coated component is used, for example, in a visible area of a vehicle, for example, as a transparent roof panel of a vehicle, layer thickness formed in the flooding area may not be sufficient to adequately protect the component against weathering and other harmful effects.

It is therefore proposed in DE 10 2006 040 200 A1 in case of coating a large, substantially flat transparent plastic roof panel of a vehicle, to spray the flooding area with paint in a spraying step before the execution of the flooding step so that in the flooding area a paint coating is formed, which consists of sprayed and flooded paint, and a paint coating is formed in the draining area of the surface to be coated, which consists only of flooded paint. In this manner, the layer thickness of the coating applied to the plastic component is as even as possible and thus the protective effect in the flooding area of the component is improved.

However, the method proposed in DE 10 2006 040 200 A1 works only with large-scale plastic components to be coated, which have a substantially planar shape and which have a vertically aligned surface extension during the coating process. However, for complex, three-dimensional components the method is not suitable, because they cannot be vertically oriented in their entirety during a coating process. Always at least one area is not necessarily oriented vertically but rather horizontally. Under certain circumstances, it is even required in a complex three-dimensional plastic component to change the orientation of the component during the coating process to prevent a local collection of run-off paint, for example, in corners and along the edges.

The cover panels of modern vehicle lighting devices are usually made of a plastic or polycarbonate, and are therefore coated with a paint to improve the scratch and weathering resilience. As a rule, cover panels have a flat or slightly curved transparent light exit surface and an adjoining outside edge area. The edge area of the cover panel of a headlight usually sticks out to the back (that is against the travel direction of the motor vehicle) from the light exit surface so that the cover panel inserted through a distal edge or the face of the edge area into a light exit opening of a housing of the lighting device can be attached to the housing, for example, by gluing or laser welding. With a tail lamp, the edge area usually sticks out forward (i.e. in the direction of travel) on the light exit area. The cover panel thus forms a complex three-dimensional plastic component with a flat or slightly curved light exit surface and an edge area protruding approximately orthogonally therefrom.

To coat the cover panel, it is usually moved through a flood curtain with a horizontally oriented light exit surface and the edge area protruding vertically downward so that the paint is flooded on the top side (the later outer side) of the light exit area. Due to the curvature of the light exit area and/or a slight inclination of the cover panel, the flooded paint can flow off laterally over the edge of the area.

The angle of inclination of the cover panel to the horizontal can be adjusted so as to keep a layer thickness of the paint on the entire top surface of the light exit surface within a predetermined tolerance window. On the outer sides of the edge area develops in this case a very thin layer thickness because of the edge area being oriented substantially vertically so that the paint flows off very quickly to the edge section.

When selecting the viscosity of the paint, there results a conflict in the coating of complex three-dimensional plastic components: on the one hand, the viscosity must be selected so low that despite the almost horizontal orientation of the light exit surface the paint flows smoothly and quickly enough so that there develop no thick paint layers on top of the light exit surface. On the other hand, the viscosity should be selected high enough that despite the almost vertical orientation of the edge area the paint does not flow fast so that no too thin layers develop on the outside of the edge section.

Although thin paint layers in the border area would not be problematic in terms of aesthetics, they could cause problems with respect to the resistance of the edge section to weathering and environmental influences. In the normal case, in the lighting device installed in the motor vehicle is visible only the transparent light exit surface. However, the edge section can be exposed to weathering (e.g. UV radiation) and environmental influences (e.g. road salt) which with a lack of protection of the edge area by the applied paint may lead to a premature aging of the plastic material and eventually even to a defect of the cover panel, leaks and penetration of moisture into the interior of the lighting device.

SUMMARY OF THE INVENTION

Therefore, the present invention is based on the object to redesign and further develop a method of coating a plastic component with paint so that it is suitable for the coating of complex, three-dimensionally shaped plastic components, such as cover panels for vehicle lighting devices.

To achieve this object, it is proposed that the draining area be sprayed prior to execution of the flooding step so that a paint coating is formed in the draining area, which consists of sprayed and flooded paint, and a paint coating is formed in the flooding area of the surface to be coated, which consists only of the flooded paint.

As an alternative solution, it is proposed that the coating of the draining area before executing the flooding step is not done in a spraying step, but by a preceding separate flooding step. Accordingly, the object is also achieved by a method of the aforementioned type, in which prior to the execution of the flooding step, the draining area is provided with paint in a separate preceding flooding step so that a paint coating is formed in the draining area, which consists of the paint applied during the preceding flooding step and of the paint applied during the subsequent flooding step, and a paint coating develops in the flooding area of the surface to be coated which consists only of the flooded paint applied during the subsequent flooding step.

The common inventive concept, which underlies the two solutions, is to apply an additional paint to the draining area before the flooding step, where for complex three-dimensional components only an insufficient layer thickness can be achieved by a pure flooding step. This can be either sprayed in a spraying step, or applied by subjecting the draining area to paint application in a preceding separate flooding step. Thus, the component is provided with an additional paint layer in the preceding step only in the critical area, which in complex three-dimensional components is formed by the draining area. Subsequently, an essentially full-surface coating of the plastic component is carried out in a flooding process. A pre-coating of the plastic component is carried out in the spraying step or in the preceding separate flooding step. The final full-scale flooding of the component achieves a visually appealing component quality and a pleasant feel (e.g. smooth surfaces). The componential coating of the plastic component with paint in the preceding spraying or flooding step creates a layer thickness increase in the draining area. Thus, the method according to the invention is particularly suitable for optimizing the coating of a complex three-dimensional component.

With the present invention it is also possible to provide such points in the draining area of the component with a paint layer by use of targeted spraying, which are difficult to reach because of the complex three-dimensional shape of the component and in which a coating by a flooding process would not be possible. Here, the combination of the spraying method for componential coating of the hard-to-reach area of the component with the subsequent full-scale flooding process provides a special advantage so that the plastic component can be provided with a paint layer of the desired layer thickness at all the required places.

In principle, the method according to the present invention is suitable for a variety of applications in which a plastic workpiece is to be provided with a paint or a coating. The process according to the invention is in particular suited for coating a complex-shaped three-dimensional plastic component with an abrasion and scratch resistant layer so that the plastic component can be used as cover panel of a lighting device of a vehicle. The cover panel is preferably made of polycarbonate. The cover panel preferably comprises a transparent light exit surface and an edge area that at least partially surrounds it and sticks out approximately orthogonally from the outer edge of the light exit surface. The light exit surface forms the flooding area of the plastic component and the edge section forms the draining area of the plastic component to be coated with additional paint prior to the execution of the flooding step.

The term flooding is to be understood in the present context in its broadest sense and includes the application processes conventionally referred to as casting, in which paint is poured from a vessel into the flooding area of the plastic component to be coated. This also applies to the preceding separate flooding step for componential coating of the draining area, which can also include the application process referred to as casting.

According to an advantageous development of the invention it is proposed that between the spraying step or the preceding flooding step and the subsequent flooding step an evaporation step takes place, and in the subsequent flooding step, the paint layer applied during the spraying step or during the preceding flooding step is partially dissolved so that a surface structure arising during the spraying step or the preceding flooding step is dissolved. By the final flooding of the surface to be coated, the surface structure arising in the spraying or the preceding flooding step and not sufficiently meeting the optical requirements is dissolved. A shining through of the so-called orange peel-like structure through the final paint layer can be prevented.

According to one embodiment, after the coating, the plastic component is subjected to a paint curing step. The paint curing step may be performed after the preceding componential coating of the draining area by spraying or flooding, or after the execution of the final flooding step. When using a conventional polysiloxane-based paint, for this purpose the coated component is heated, for example, to a temperature of about 100° C. to 150° C. However, there can also be used polysiloxane paints, which cure under the action of UV radiation, wherein the paint curing step would then include irradiation with UV radiation.

In one embodiment, the coating on the plastic component is expediently carried out in a temperature range between 20° C. and 40° C., i.e. essentially at room temperature, but it also depends on the actually used paint. This applies both to the preceding componential coating of the draining area by spraying or flooding and the final flooding step. In order to be able to ensure the predetermined temperature for the component from the beginning as part of the coating process, the plastic component is preferably brought before any coating of the paint to a temperature between 20° C. and 40° C., which is then kept within this temperature window during all or part of the coating.

According to another embodiment of the invention, the spray painting with a spray nozzle and/or the preceding flood coating and/or the subsequent flood coating is performed by flood nozzles. This allows a particularly space-saving and resource-saving coating of the component with the paint. In addition, there results a high degree of flexibility if a position and orientation of the spray nozzles and/or the flood nozzles during the coating of the plastic component with the paint using a robot can be varied relative to the plastic component. In this way, for example a draining area of a complex three-dimensional component difficult to reach in the spraying itself can be reached and sprayed with paint.

In order to allow even in this case a secure and reliable componential coating of the draining area of the plastic component in the spraying step or in the preceding flooding step with a desired layer thickness, the paint used for the spraying step or the preceding flooding step may have a higher viscosity than the paint used for the subsequent flooding step.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
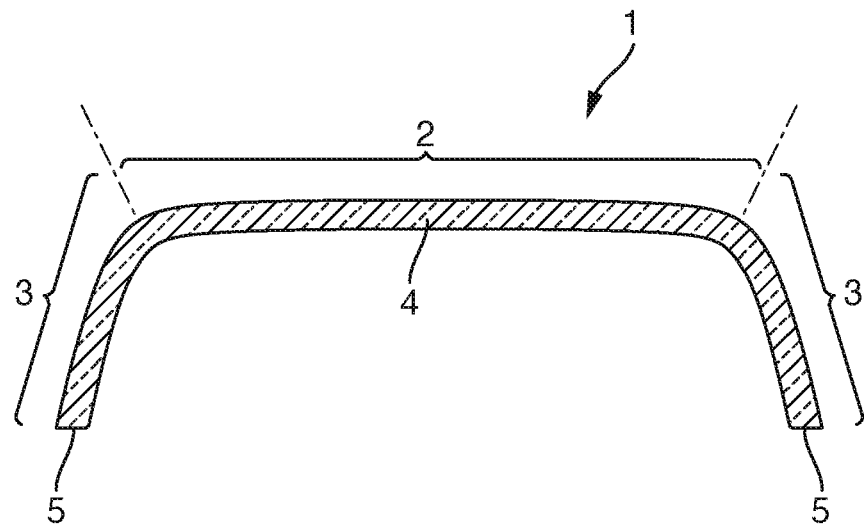
FIG. 1 shows a complex multi-dimensional plastic component to be coated with the inventive process.

The figures show a complex multi-dimensional plastic component 1, which consists for example of polycarbonate and may be made by an injection embossing process. The plastic component 1 illustrated here forms a transparent or at least partially colored cover panel, which closes a light exit opening of a lighting device of a vehicle. The lighting device can be a headlight, a taillight or any other light of the motor vehicle. The cover panel can be provided with optically effective elements (e.g. prisms or cylindrical lenses) to deflect the passing light beams (the so-called diffuser).

A typical cover panel 1 comprises a transparent light exit surface 2, which is designed flat or slightly arched. In the example, the surface 2 is slightly convex upwards. The light exit surface 2 is part of the cover panel 1, through which passes light after the lighting device has been installed in the motor vehicle and has been activated. Further, the cover panel 1 comprises an edge region 3 which at its outer edge at least partially surrounds the light exit surface 2, which extends at an angle to the light exit surface 2. In the illustrated example, the edge region 3 is located nearly orthogonally to the light exit surface 2. The edge region 3 projects starting from the outer periphery of the light exit surface 2 downwards. In the headlamp properly mounted in a motor vehicle, it extends counter to the direction of travel of the motor vehicle. In a rear light, the edge region 3 would extend essentially in the direction of travel. With the lighting device properly arranged in the motor vehicle, the edge region 3 is usually no longer visible, because it is obscured by body parts (e.g. hood, tailgate, fenders, bumper, etc.).

In a lighting device configured as a headlamp, the light exit surface 2 is preferably transparent. In a taillight 5, the light exit surface 2 can be colored in one or more colors. The coloring of the cover panel 1 can be achieved either by coloring the plastic material 4 of the cover panel 1, or by coating it with a colored paint. The light exit surface 2 of a rear light can be colored, for example, red (for tail light, brake light or rear fog light) or orange/yellow (for flashing). The edge region 3 of the cover panel 1 can be colored both for headlights and taillights in any way (e.g. black or silver). Here too, the coloring of the edge region 3 can be achieved either by coloring the plastic material 4 of the cover panel 1 or by coating it with a correspondingly colored paint.

The cover panel 1 is inserted with a distal edge section 5 of the edge region 3 into a correspondingly shaped groove in a housing of the lighting device and attached there, for example by adhesive bonding or laser welding. The groove in the housing of the lighting device surrounds the light exit opening of the lighting device. In the groove can be arranged a bead of adhesive, made for example of bitumen, for sealing and attaching the cover panel 1.

The present invention relates to a method of applying a paint layer on the outer surface of the cover panel 1, which is particularly well suited for complex three-dimensional plastic components of any kind. In particular, with the inventive method it is now possible to provide specific, hard to reach area of the component 1 with a paint layer of a predetermined, defined layer thickness. The paint layer is used to produce a scratch-resistant and weather-resistant protective layer 5. The paint is preferably transparent and made based on polysiloxane.

For the coating of the outer surface, the plastic component 1 illustrated in static state in FIG. 1 is introduced into a painting facility in such a manner that one section (in FIG. 1, the transparent light exit surface 2) is essentially horizontally oriented and the other section (in the illustrated plastic component 1 the edge region 3) is oriented essentially vertically. It is known how to coat the part 1 with a paint layer in such a manner that in a flooding step the outer surface of the plastic component 1 to be coated is flooded with paint applied to a flooding area 2 which then flows off over a draining area 3. However, this flooding step alone leads to very different layer thicknesses of the applied paint layer, especially to very thin thicknesses of the paint layer in the region of the draining area 3. For this reason, the invention is directed toward an improved coating process for complex, three-dimensional plastic components 1.

Figure 2:
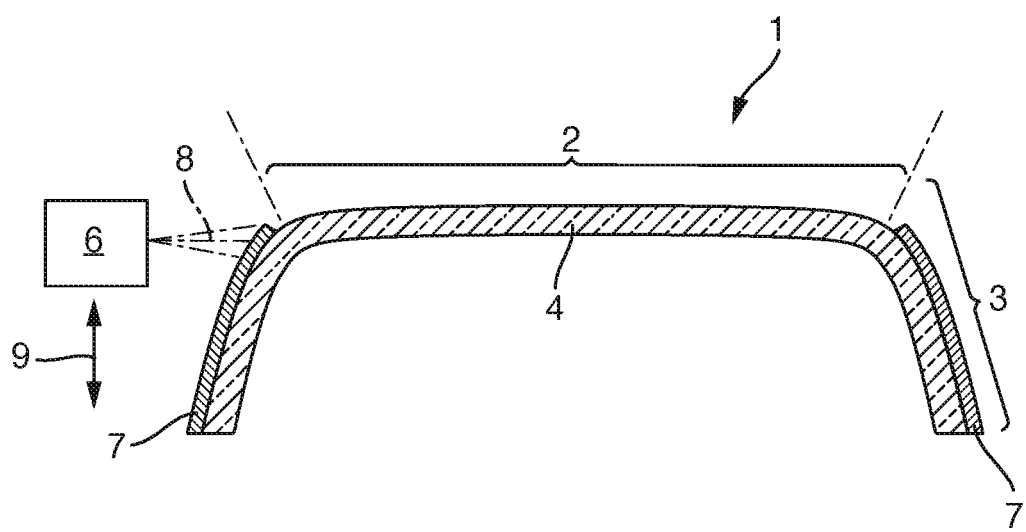
FIG. 2 shows the plastic component from FIG. 1, whose draining area is sprayed with paint in a preceding spraying step.

In the painting facility at a first working station which is assigned to a so-called spraying step, a paint 8 for forming a spray layer 7 is sprayed onto the surface to be coated of the plastic component 1 in the region 3 by spray nozzles 6 (see FIG. 2). The area 3, which is provided with atomized paint 8, represents the draining area of the subsequent flooding step described in detail with reference to FIG. 5. The area 3 can be provided either on the entire surface or only partially with the spray layer 7. In the example of FIG. 2, a spray nozzle 6 is shown, which sprays the paint in a relatively highly focused spray jet 8 on the outer surface of the draining area 3. In order to spray a desired surface section of region 3 with paint 8, the spray nozzle 6 can be moved in the direction of an arrow 9 back and forth. Alternatively, it is of course conceivable that the spray nozzle 6 is formed fixed and the cover panel 1 moves back and forth in the opposite direction. It depends alone on a relative movement between the surface extension of the cover region 3 of the panel 1 and of the spray nozzle 6 and the spray jet 8. The spraying step may be executed on the entire edge region 3 or only on parts of the edge region 3.

Figure 3:
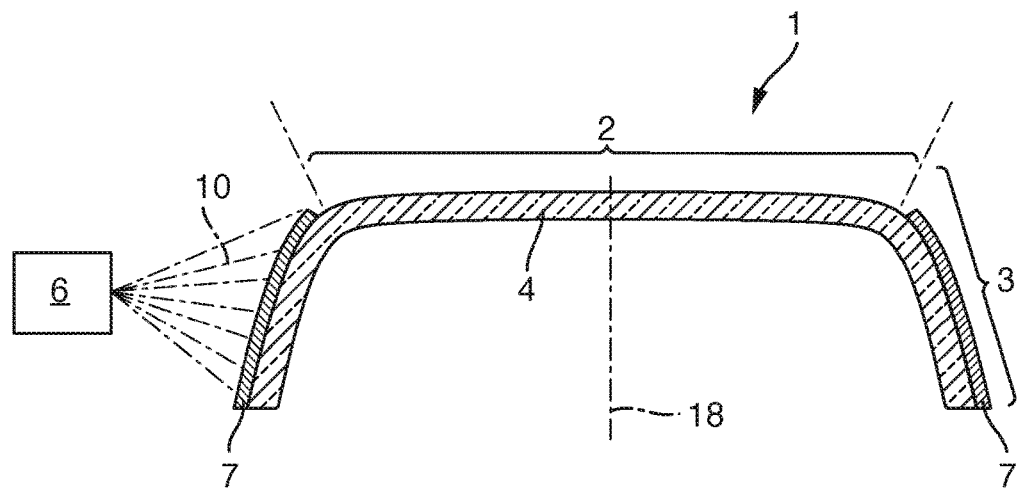
FIG. 3 shows the plastic component from FIG. 1, whose draining area is sprayed with paint in a preceding spraying step.

FIG. 3 shows an alternative embodiment, in which the spray nozzle 6 has a relatively widely spread spray jet which can provide the desired surface section of the edge region 3 with the spray layer 7 without any movement of the nozzle 6 relative to the surface extension of the region 3 of the cover panel 1. In order to provide the outer surface of the edge region 3 with the spray layer 7 over a larger area, it is conceivable that the cover panel 1 is rotated about a rotation axis 18 relative to the spray 10. Alternatively, with a fixed cover panel 1, the spray nozzle 6 can rotate about the axis 18 relative to the cover panel 1. Of course, rotation of the cover panel 1 or the spray nozzle 6 about the axis 18 would be conceivable also in the example of FIG. 2.

Figure 4:
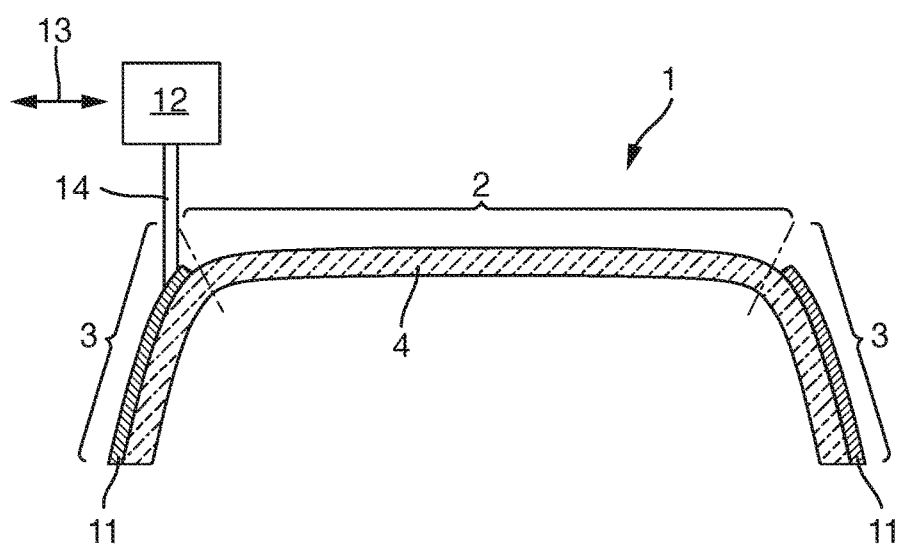
FIG. 4 shows the plastic component of FIG. 1 whose draining area is provided with paint in a preceding flooding step.

FIG. 4 shows a further alternative embodiment of the invention, wherein a first flood layer 11 is applied on the outer surface of the edge region 3 or a partial area of the edge region 3. For this purpose, an application device 12 is provided, which floods the region 3 or a section thereof with paint to create the flood layer 11 on the outer surface of the edge region 3. It is conceivable that the application device 12 is moved back and forth in the direction of arrow 13 so that paint 14 is flooded to the desired section of the edge region 3. Alternatively, it is conceivable that the application device 12 is designed to be stationary and instead the cover panel 1 is moved in the direction of arrow 13 back and forth relatively to the applicator 12 so that the flooded paint 14 forms the paint layer 11 of the desired size.

FIGS. 2 to 4 illustrate the process of applying a first paint layer 7, 11 only on a left edge region 3 or a portion of the draining area of the plastic component 1. Of course, the paint layer 7, 11 can also be applied in a corresponding manner to the edge region 3 on the opposite side of the plastic component 1 or any other desired section of the edge region 3. It is also conceivable that paint layers 7, 11 are applied to different sections of the draining area 3 in different ways. FIGS. 2 to 4 demonstrate different possibilities of providing a draining area 3 of a complex three-dimensional plastic component 1 with a componential paint layer 7, 11 at least in some area.

After completion of the coating step illustrated in FIGS. 2 to 4 for componential applying of the paint layer 7, 11, one can let the paint 7, 11 briefly evaporate. On the paint layer 7, 11 is formed a surface structure, which under certain circumstances may not correspond to a desired or required aesthetic appearance, for example, because it is formed orange peel-like. However, this can be corrected in the subsequent flooding step (see FIG. 5) as will be explained.

Figure 5:
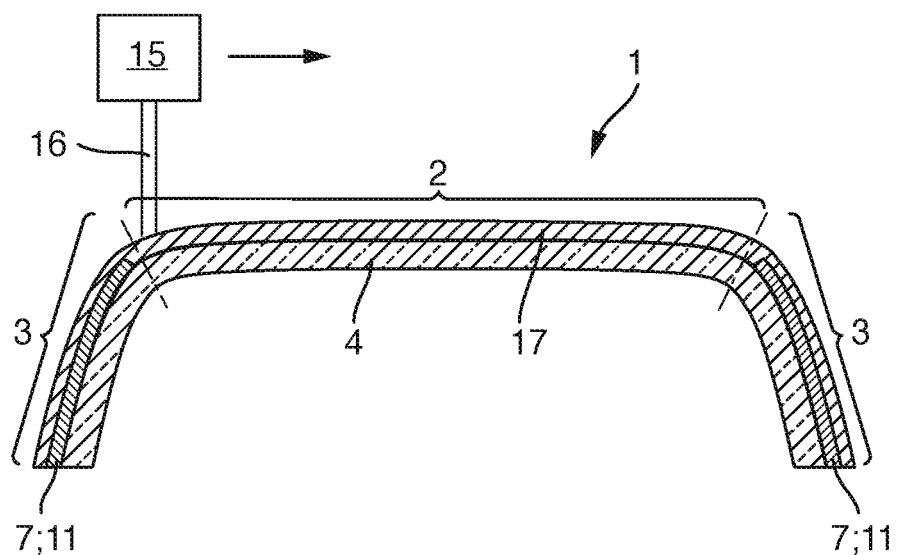
FIG. 5 shows a plastic component from the FIGS. 2 to 4, to whose flooding area is flooded paint in a subsequent flooding step.

In the subsequent flooding step of FIG. 5, the plastic component 1, which in the preceding step has been provided with the paint layer 7, 11 (see FIGS. 2 to 4), is flooded by an applicator in another workstation with paint 16 in its flooding area 2. The paint used for the flooding step 16 can correspond to the paint 8, 10; 14 which was used for the spraying step of the FIG. 2 or 3 or for the preceding flooding step of FIG. 4. However, the paint 16 for the subsequent flooding step preferably has a lower viscosity than the paint 8, 10 14 used for the spraying step (see FIG. 2 or 3) or for the preceding flooding step (see FIG. 4).

The paint flooded in the flooding area 2 flows over the vertically oriented edge region 3 of the plastic component 1 on the surface to be coated downwards so that the edge area 3 represents the so-called draining area. There thus forms on the outer surface of the plastic component 1 over the entire surface a paint layer designated here as flood layer 17 with a layer thickness distribution, which arises in dependence on the inclination of the transparent light exit surface 2 or the corresponding edge portion 3 of the plastic component 1. In particular, the layer thickness of the flood layer 17 in the draining area 3 is smaller than in the flooding area 2. This results from the fact that the paint 16 flows faster off the vertically-oriented edge region 3 than off the horizontal light exit surface 2. The lower layer thickness of the flood layer 17 in the draining area 3 is compensated by the additional componential paint layer 7, 11 applied in the preceding coating step thus resulting in a substantially constant thickness over the entire surface of the plastic component 1 to be coated. In any case, the resulting thickness of the paint layer comprising the previously applied paint layer 7, 11 and the flood layer 17 over the entire surface to be coated is within a predetermined tolerance window.

In a final procedure, the plastic component 1 provided with paint can be subjected to a paint curing step being heated to about 100° C. to 150° C. Alternatively or additionally, the paint-coated plastic component 1 can also be exposed to irradiation with ultraviolet radiation to cure the paint used.

The inventive combination of a spraying process (see FIGS. 2 and 3) or a separate preceding flooding process (see FIG. 4) for componential coating of the draining area 3 and a subsequent flooding process (see FIG. 5) for large-area coating of the total surface to be coated also allows to produce in complex, three-dimensional plastic component 1 a paint layer with a defined layer thickness structure. In particular, a layer thickness can be achieved in the draining area 3, which satisfies the requirements regarding scratch and weather resistance set for the exterior body of a vehicle.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for coating a cover panel of a motor vehicle lighting device with a paint, wherein said method includes the step of flooding a surface of the cover panel to be coated with paint in a flooding area to form a paint layer and the paint flows off through a draining area, wherein before the flooding step the draining area is sprayed with paint so that a paint layer is produced in the draining area, which consists of sprayed and flooded paint, and a paint layer is produced in the flooding area of the surface of the cover panel, which consists only of flooded paint; and wherein the cover panel comprises a transparent light exit surface and an edge region at least partially surrounding it, wherein the light exit surface forms the flooding area of the plastic component and the edge region of the draining area of the plastic component.

2. The method as set forth in claim 1, wherein between the spraying step and the subsequent flooding step an evaporation step is carried out and during the subsequent flooding step the paint layer applied in the spraying step is dissolved so that a surface structure arising in the spraying step is dissolved.

3. The method as set forth in claim 1, wherein the cover panel after its coating with the paint is subjected to a paint curing step.

4. The method as set forth in claim 1, wherein before the coating with the paint, the cover panel is brought to a temperature between 20° C. and 40° C.

5. The method as set forth in claim 1, wherein during the coating with the paint, the cover panel is kept at a temperature between 20° C. and 40° C.

6. The method as set forth in claim 1, wherein the spraying step is carried out by spraying nozzles.

7. The method as set forth in claim 6, wherein a position and/or orientation of the spraying nozzles during the coating of the cover panel with the paint is varied by a robot relative to the plastic component.

8. The method as set forth in claim 1, wherein the cover panel is made of polycarbonate.

9. The method as set forth in claim 1, wherein the paint includes polysiloxane.

10. The method as set forth in claim 1, wherein the paint used for the spraying step has a higher viscosity than the paint used for the subsequent flooding step.

11. A method for coating a plastic component with a paint, wherein said method includes providing a surface of the plastic component to be coated with a paint layer by applying paint to a flooding area of the surface to be coated and by the paint flowing off through a draining area, wherein before the execution of the flooding step, the draining area is provided with paint in a separate preceding flooding step, which consists of the paint flooded during the preceding flooding step and during the subsequent flooding step, and a paint coating is formed in the flooding area of the surface of the plastic component, which consists only of the paint flooded during the subsequent flooding step; and wherein the paint used for the preceding flooding step has a higher viscosity than the paint used for the subsequent flooding step.

12. The method as set forth in claim 11, wherein an evaporation step is carried out between the preceding flooding step and the subsequent flooding step an evaporation step is carried out and during the subsequent flooding step the paint layer applied in the preceding flooding step is dissolved so that a surface structure arising in the preceding flooding step is dissolved.

13. The method as set forth in claim 11, wherein the preceding flooding step and/or the subsequent flooding step is carried out by means of flooding nozzles.

14. The method as set forth in claim 13, wherein a position and/or orientation of the flooding nozzles during the coating of the plastic component with the paint is varied by means of a robot relative to the plastic component.

* * * * *